March 2, 1954
E. FLEISCHER
2,670,870
INTERLOCKING INSULATION COVER FOR
CABLE CONNECTORS AND TERMINALS
Filed Feb. 21, 1951
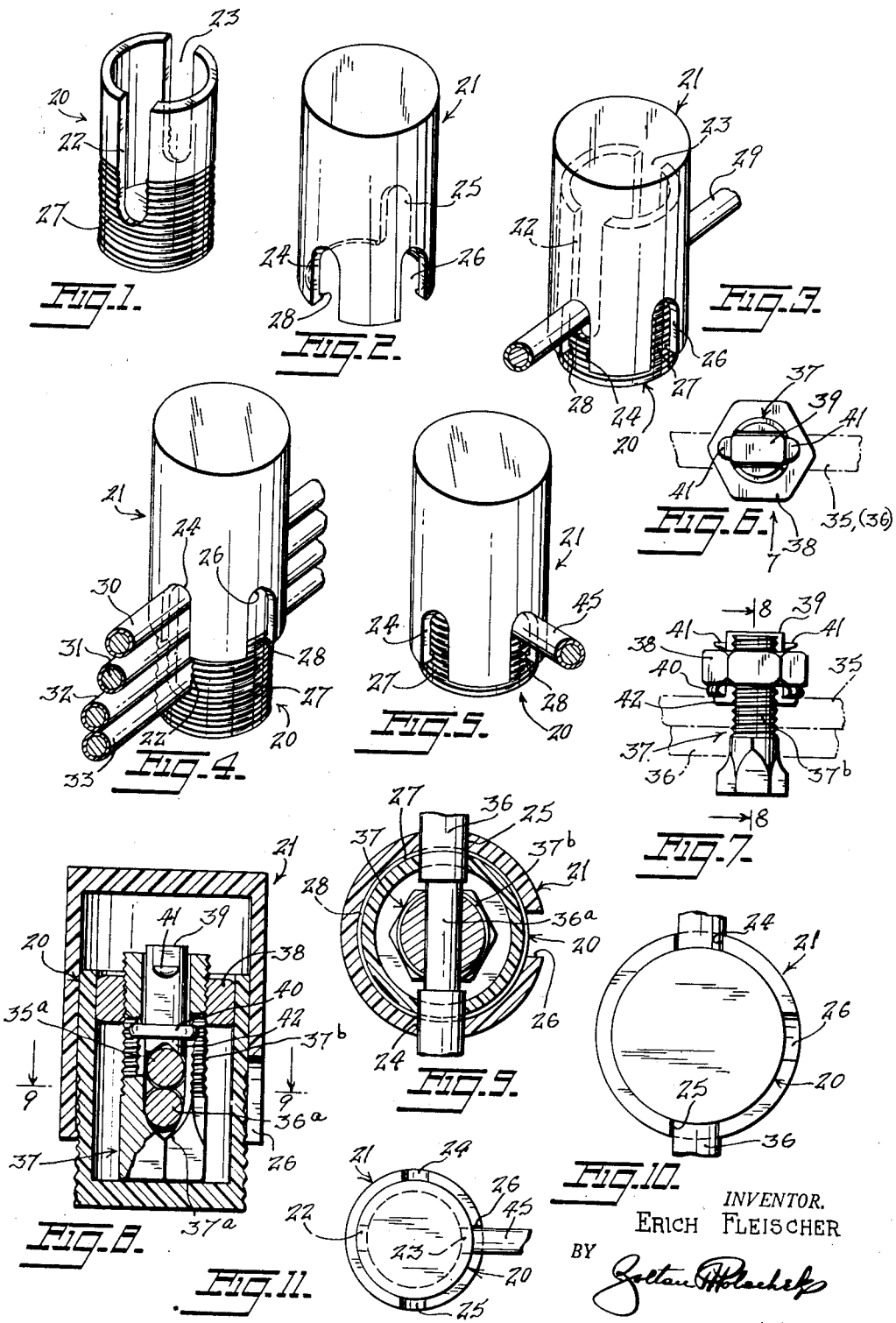
INVENTOR.
ERICH FLEISCHER
BY
Zoltan Holecek
ATTORNEY Patented Mar. 2, 1954

2,670,870

UNITED STATES PATENT OFFICE 2,670,870

INTERLOCKING INSULATION COVER FOR CABLE CONNECTORS AND TERMINALS

Erich Fleischer, New York, N. Y.

Application February 21, 1951, Serial No. 211,989

3 Claims. (Cl. 220—3.94)

This invention relates to new and useful improvements in electrical wire connectors; and, more particularly, the aim is to provide a novel and valuable auxiliary for an electrical wire connector adapted to constitute a protective enclosure for the connector and such bared portions of the wire or wires clamped in the connector as may project beyond the outer limits of the connector.

The connectors referred to are extensively used for connecting or attaching service conductors to main feeder lines, for connecting transformer leads to power supply conductors, and for other analogous purposes, as for securing a dead-end conductor, bringing into close electrical contact a greater or less plurality of conductors as may be required for a variety of purposes. A number of such connectors of varying designs are on the market, all of the class sometimes called solderless connectors. They ordinarily comprise a barrel-like assembly incorporating a bifurcated part through the slotted portion of which one or more wires to be clamped together are extended, and a pair of clamping jaws one of which is located at the bottom of such slot and the other of which is carried by a complementary part including a nut to be spirally advanced lengthwise of the bifurcated part for forcing said jaws toward each other. With all parts of the connector made of metal, as is usually the case, a person accidentally touching the connector as customarily installed runs the risk of receiving a serious electrical shock.

The present invention proposes a protective enclosure for a solderless connector and for the wire or wires leading to and/or issuing therefrom, which enclosure, made of insulating material, as a plastic, and desirably in the form merely of a pair of cup-shaped units one telescopically receivable within the other, is so constructed that substantially instantaneously it may be established at the connector location and completely about the latter and such bared portions of the wire or wires clamped in the connector as may project beyond the outer limits of the connector.

Also, according to the invention, the new protective enclosure is readily adjustable so as to be protectively effective as just stated, regardless of whether it is one, two, three or even more conductors which are clamped in the connector.

Further, according to the invention, when the new protective enclosure is thus adjusted, it becomes dependably locked against accidental disturbance of the adjustment; but, nevertheless, whenever for any reason there is need or desire to remove the protective enclosure, this can be readily accomplished without injury to the enclosure or any part thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view, showing one member of a now favored embodiment of the protective enclosure of the invention; this member being the cup member.

Fig. 2 is a similar view, showing the other and complementary member of said embodiment; this member being the cap member, for telescopically housing all or a portion of the length of the cup member.

Fig. 3 is also a perspective view, showing the protective enclosure as established relative to a contained connector, and as telescopically adjusted to take care of the situation where said connector is clampingly engaging a single conductor; in this view the hidden parts of the cup member being indicated in broken lines.

Fig. 4 is a perspective view, showing said enclosure as telescopically adjusted to take care of the situation where the contained connector is clampingly engaging as many as four conductors.

Fig. 5 is also a perspective view, showing said enclosure as in a different assembly, that is, with one of the two cup and cap members angularly displaced relative to the other through about 90° and with the enclosure telescopically adjusted to take care of the situation where a single dead-end conductor is clamped in the contained connector.

Fig. 6 is a top plan view of one well-known type of connector of the barrel-like-assembly kind.

Fig. 7 is a side elevation, looking in the direction of the arrow 7 of Fig. 6; with the two conductors here assumed to be clamped in the connector indicated in dot and dash lines.

Fig. 8 is an enlarged vertical section, taken on the line 8—8 of Fig. 7, with the connector and its two conductors in the protective enclosure of Figs. 1-5, and with said enclosure adjusted in agreement with the fact that two conductors are clamped in the connector and neither of these is a dead-end conductor.

Fig. 9 is a horizontal section, taken on the line 9—9 of Fig. 8.

Fig. 10 is a bottom plan view of the assembly of Figs. 8 and 9.

Fig. 11 is a bottom plan view of the assembly of Fig. 5.

Referring now to the drawings more in detail, the aforesaid cup member is designated 20, and the aforesaid complementary cap member is designated 21. The cup member 20 is shown as having a pair of slots 22 and 23, each directly opposite the other, and both of like shape. The cap member is shown as having three slots, these all alike, and of the same width but of less length than the slots 22 and 23 of the cup member; said three slots of the cap member being respectively designated 24, 25 and 26. The slots 24 and 25 are directly oppositely located, that is, one is spaced 180° apart from the other; while the slot 26 is midway between the slots 24 and 25, that is, spaced 90° from either.

The said two members 20 and 21 are of insulating material, and are desirably molded of a suitable plastic.

A multiplicity of like and uniformly spaced circular grooves 27 are formed externally on the cup member 20, each of these as shown desirably lying in a plane parallel with the bottom of said member; thereby to provide a multiplicity of like and uniformly spaced circular ridges running all around the said member except where interrupted by the slots 22 and 23.

For coaction with some one of said grooves 27, according to the degree of telescopic overlap of the cup member 20 by the cap member 21, the latter has a rather tiny internal bottom flange 28, this running all around the said cap member 21 except where interrupted by the slots 24, 25 and 26.

The said degree of telescopic overlap of the member 20 by the member 21 will depend on the number of conductors, whether one or more, clamped in the connector to be housed in the protective enclosure; and said overlap will be, for instance, as in Fig. 3, where a single conductor 29 is shown as present, or as in Fig. 4, where four conductors 30, 31, 32 and 33 are shown as present, or as in Fig. 8, where two conductors 35 and 36 are shown as present, or otherwise according as a plurality of conductors are present to a total other than as indicated in Figs. 3, 4 and 8.

Where the conductor or conductors project from both opposite sides of the housed connector, as indicated in Figs. 3, 4 and 8, one of the slots 22 and 23 of the cup member 20 will be aligned with one of the slots 24 and 25 of the cap member 21; so that, with the two members telescopically coupled by overlap to an appropriate degree as above explained, thereby to cause interlatching of the flange 28 of the cap member 21 with some one of the grooves 27 of the cup member 20, each of the pairs of slots 22—24 or 22—25 and 23—24 or 23—25 will combine to establish an aperture of a size, in the case where there is merely a single conductor as in Fig. 3, to take snugly around the insulation sheathing of that conductor, or to establish an aperture elongated in the direction of length of the enclosure and thus elongated to an extent such, where there are more than a single conductor as in Fig. 4 or 8, that said aperture snugly engages said conductors, at their insulation sheathings, and girthingly of the group thereof.

Thereby, the usual necessity of laboriously taping the connector all over the same and particularly carefully at the places adjacent to the clamping jaws thereof where unbared portions of the conductor or conductors present are slightly protruding, is eliminated; yet when the need or desire arises, the enclosure may be readily opened up by forcibly pulling the two members 20 and 21 apart with the direction of pull exerted lengthwisely of their slots. The force required for this pull is not inconveniently great, because of the resilient nature of the plastic employed in making the parts, which resilient property is relieved for action at the flange 28 at the bottom of the cap member 21, by the fact that said flange is at several points interrupted by the slots 24, 25 and 26; yet the interlock or interlatch between the said flange 28 and the appropriate one of the grooves 27 on the cup member 20, automatically occurring when the proper overlap of said member 20 by the cap member 21 is effected, is many times as secure as would be required absolutely to prevent any accidental breaking of said interlock.

If desired, the slots 24, 25 and 26 can be elongated further up into the cap member 21 so that when the cap member is engaged over the cup member 20, the bottom of the cap member will more closely approach a flush alignment with the bottom of the cup member. In addition, the slots 24, 25 and 26 of the cap member 21 could be closed by thin membranous walls, formed of the same material used for forming the cap member, and which could be knocked out of the slots 24 and 25 if the article is to be used for joining two or more cables or out of the slot 26 if the article is to be used for covering the exposed end of a single cable. Thus, to which ever use the article is put, the unused slot or slots would remain closed.

It is appreciated, of course, that the width of the slots in both the cup member 20 and the cap member 21 and the sizes of those members will be varied in accordance with the diameter of the particular cables with which the article is to be used; the articles will be supplied in different sizes for use on cables of different diameters.

Referring more especially at this point to Figs. 6–10, and noting that the bared portions of the conductors 35 and 36 of Figs. 8–10 are respectively designated 35ᵃ and 36ᵃ, it may be well briefly to describe the connector shown, by way of example, in Figs. 6–8; although this connector is well known in the art. The same comprises a bifurcated bolt member 37, thereby to provide on itself and in and at the bottom of its furcation one clamping jaw 37ᵃ. A nut 38 has its thread matching the thread 37ᵇ of the member 37; and rotatively coupled to the nut 38 is a slide-block 39, such coupling being effected by way of a pair of bottom arcuate enlargements 40 on the bottom of the slide-block and by way of a pair of chiseledly offset tongues 41 at the top of the slide-block. The clamping jaw complementary to the jaw 37ᵃ is provided between a pair of ribs 42 of triangular cross-section dependent from the slide block 39 and extending across the same so as to pass below the central portions of said arcuate enlargement 40.

Referring next especially to Figs. 5 and 11, here, as already explained at the brief description of Fig. 5, the protective enclosure of the invention is shown as having its two members telescopically adjusted to take care of the situation where a single dead-end conductor is clamped in the contained connector. In Figs. 5 and 11, said conductor is designated 45. It will be noted that now one of the two slots 22 and 23 (indicated in Fig. 11 in broken lines as the slot 23) is aligned, not with either of the slots 24 and 25, but with the slot 26, of the cap member 21. The consequence is that the protective housing is closed all over, except for a substantially circular aperture snugly embracing the insulation sheathing of the conductor 45.

The additional slot 26 is a means for serving a purpose like that just discussed, thereby to make the cap and cup members as it were universally adaptable, and also a means for giving an additional interruption to the continuity of the bottom flange 28 in the cap member 21, thereby markedly to increase the ease of pulling apart the two members 20 and 21 when their separation is deliberately intended, as compared with the yieldability of said flange when interrupted merely at two diametrically opposite points.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A protective enclosure for the purpose described, comprising a first shell unit in the form of a cup member having a substantially cylindrical side wall, and a second shell in the form of a cap member having a substantially cylindrical side wall, said cap member having an internal diameter so approximating the external diameter of said cup member that said cap member may telescopically overlap said cup member, said cup member having a pair of substantially diametrically oppositely located slots extended down along its side wall from the cup top, said cap member having a pair of substantially diametrically oppositely located slots extended up along its side wall from the cap bottom, said slots terminating intermediate the length of the cap and the cup, there being a forcibly releasable latching means comprising a plurality of grooves encircling the exterior of said cup member and an internal annular flange on the bottom of said cap member for entry into a groove portion of said formation whereby said groove portion may constitute a keeper for said flange.

2. A protective enclosure for the purpose described, comprising a first shell unit in the form of a cup member having a substantially cylindrical side wall, and a second shell in the form of a cap member having a substantially cylindrical side wall, said cap member having an internal diameter so approximating the external diameter of said cup member that said cap member may telescopically overlap said cup member, said cup member having a pair of substantially diametrically oppositely located slots extended down along its side wall from the cup top, said cap member having a pair of substantially diametrically oppositely located slots extended up along its side wall from the cap bottom, said slots terminating intermediate the length of the cap and the cup, there being a forcibly releasable latching means comprising a plurality of circular grooves encircling the exterior of said cup member and an internal annular flange on the bottom of said cap member for entry into a groove portion of said formation whereby said groove portion may constitute a keeper for said flange, each of said members being of a plastic material, and said flange being so positioned in said cap member that the slots of said cap member interrupt the continuity of said flange, said cap member having an additional slot extended up along its side wall from the cap bottom.

3. A protective enclosure for the purpose described, comprising a first shell unit in the form of a cup member having a substantially cylindrical side wall, and a second shell in the form of a cap member having a substantially cylindrical side wall, said cap member having an internal diameter so approximating the external diameter of said cup member that said cap member may telescopically overlap said cup member, said cup member having a pair of substantially diametrically oppositely located slots extended down along its side wall from the cup top, said cap member having a pair of substantially diametrically oppositely located slots extended up along its side wall from the cap bottom, said slots terminating intermediate the length of the cap and the cup, there being a forcibly releasable latching means comprising a plurality of circular grooves encircling the exterior of said cup member and an internal annular flange on the bottom of said cap member for entry into a groove portion of said formation whereby said groove portion may constitute a keeper for said flange, each of said members being of a plastic material, and said flange being so positioned in said cap member that the slots of said cap member interrupt the continuity of said flange, said cap member having an additional slot extended up along its side wall from the cap bottom, said grooves lying in a plane substantially parallel with the bottom of said cup member.

ERICH FLEISCHER.

References Cited in the file of this patent

UNITED STATES PATENTS

| Number | Name | Date |
| --- | --- | --- |
| 391,029 | Crowell et al. | Oct. 16, 1888 |
| 771,240 | Gill | Oct. 4, 1904 |
| 1,056,452 | Remhilt | Mar. 18, 1913 |
| 1,387,358 | Costello | Aug. 9, 1921 |
| 1,981,685 | Blackburn et al. | Nov. 20, 1934 |
| 1,984,181 | French | Dec. 11, 1934 |
| 2,164,381 | Bradley | July 4, 1939 |
| 2,324,791 | McLaughlin et al. | July 20, 1943 |
| 2,470,320 | Page | May 17, 1949 |

FOREIGN PATENTS

| Number | Country | Date |
| --- | --- | --- |
| 366,378 | Germany | Jan. 4, 1923 |
| 663,894 | Germany | Aug. 16, 1938 |